United States Patent [19]
Wilburn

[11] Patent Number: 5,866,267
[45] Date of Patent: Feb. 2, 1999

[54] ORIENTED FILM WITH IMPROVED MEMORY

[75] Inventor: Daniel S. Wilburn, Simpsonville, S.C.

[73] Assignee: W. R. Grace & Co.-Conn., Duncan, S.C.

[21] Appl. No.: 335,434

[22] Filed: Nov. 7, 1994

[51] Int. Cl.$^6$ .............................. B65B 53/00; B32B 27/32
[52] U.S. Cl. ........................ 428/500; 428/515; 428/516; 428/520; 428/517; 428/34.9; 428/910
[58] Field of Search .................................. 428/517, 309, 428/516, 515, 910, 35.4, 35.2, 34.9, 500, 520; 525/194, 195, 240; 524/425

[56] References Cited

U.S. PATENT DOCUMENTS

| | | | |
|---|---|---|---|
| 533,801 | 8/1895 | Eppert, Jr. | 525/232 |
| 3,597,372 | 8/1971 | Cook | 260/4 |
| 4,302,577 | 11/1981 | Yoshimura et al. | 525/211 |
| 4,311,628 | 1/1982 | Abdou-Sabet | 260/33.6 |
| 4,459,385 | 7/1984 | McCullough, Jr. | 525/88 |
| 4,514,465 | 4/1985 | Schoenberg | 428/339 |
| 4,532,189 | 7/1985 | Mueller | 428/516 |
| 4,551,380 | 11/1985 | Schoenberg | 428/218 |
| 4,617,241 | 10/1986 | Mueller | 428/520 |
| 4,639,487 | 1/1987 | Hazelton et al. | 524/425 |
| 4,643,943 | 2/1987 | Schoenberg | 428/339 |
| 4,724,185 | 2/1988 | Shah | 428/339 |
| 4,863,769 | 9/1989 | Lustig et al. | 428/34 |
| 4,894,408 | 1/1990 | Hazelton et al. | 524/425 |
| 4,908,253 | 3/1990 | Rasmussen | 428/114 |
| 4,927,708 | 5/1990 | Herran et al. | 428/332 |
| 4,978,717 | 12/1990 | Hazelton et al. | 525/195 |
| 5,210,139 | 5/1993 | Huff et al. | 525/194 |

FOREIGN PATENT DOCUMENTS

| | | |
|---|---|---|
| 0276908 | 8/1988 | European Pat. Off. . |
| 0308106 | 3/1989 | European Pat. Off. . |
| 0565938 | 10/1993 | European Pat. Off. . |
| 1209825 | 10/1970 | United Kingdom . |
| 2037660 | 7/1980 | United Kingdom . |

OTHER PUBLICATIONS

Schut, "Enter a New Generation of Polyolefins," Plastics Technology, pp. 15–17, Nov. 1991.
Van der Sanden and Halle, "A new family of linear ethylene polymers provides enhanced sealig performance" Tappi Journal, pp. 99–103, Feb. 1992.
"Ionmers," Encyclopedia of Polymer Science and Engineering, vol. 6, p. 423, 1985.
US Reactor Thermoplastic POL Exxtral p. 02, 1992.
US In–Reactor TPOS New Products p. 72 Apr. 1994.
US Polyolefin Modi Exact Polyolefines VIIII Feb. 1993.
US Emac Resins as Alternativ Chevron Speciality Mar. 8, 1994.
US Development of In–Situ Quantum Chemical pp. 1382–1384 1991.
US Successful TPO Painting Himont Antec pp. 1507–1508 1991.
US Novel Olefin Copolymers Technology News pp. 28–31 Jun. 1993.
US Thermoplastic Polyolefins PW Resin Profile p. 67 Mar. 1995.
US Reactor TPOS Starting IM Technology News p. 31 Jul. 1992.
US Eastman Introduces TPOS Newfocus p. 57 Mar. 1994.

*Primary Examiner*—Paul J. Thibodeau
*Assistant Examiner*—D. Lawrence Tarazand
*Attorney, Agent, or Firm*—Mark B. Quatt

[57] ABSTRACT

An oriented thermoplastic film, comprising at least one layer comprising a thermoplastic polyolefin (TPO). Films of the present invention exhibit improved memory properties compared with conventional PVC and shrink films. The films are preferably heat shrinkable, and can comprise two or more layers in a multilayer construction.

4 Claims, 1 Drawing Sheet

ORIENTED FILM WITH IMPROVED MEMORY

BACKGROUND OF THE INVENTION

The present invention relates to thermoplastic films, more particularly to packaging films, especially films useful in packaging food products such as poultry.

In the packaging of products, especially food products such as poultry, PVC (polyvinyl chloride) has been a traditional packaging material.

PVC suffers from several deficiencies, including environmental concerns about possible migration of vinyl chloride monomer residuals, as well as plasticizer, into a food product packaged with PVC. PVC sometimes has lower abuse resistance and poorer memory than alternative packaging materials.

More recently, olefinic materials such as SSD film and SES film provided by the Cryovac Division of W. R. Grace & Co.-Conn. have proven useful in packaging poultry. These olefinic materials have excellent physical properties, including good memory. By "memory" is meant the propensity of the packaging material, after being stretched over for example a trayed food product, to substantially return to its original dimensions after product settling. Also, it refers to the tightness of the trayed package during storage and distribution. Films with poor memory tend to show slackness or looseness in the packaging film overwrap of a trayed food package.

It is desirable, especially when packaging "high profile" foods, i.e. foods that project above the edge of the tray, such as whole poultry, or poultry parts, to have films with even better memory. This would then allow for product settling while still substantially maintaining the tight package appearance.

The present invention solves this need by a multilayer oriented film which includes a thermoplastic polyolefin (TPO) in the film structure.

SUMMARY OF THE INVENTION

In one aspect of the invention, an oriented, thermoplastic film comprises at least one layer comprising a thermoplastic polyolefin (TPO).

BRIEF DESCRIPTION OF THE DRAWINGS

The invention may be further understood with reference to the drawings in which.

DESCRIPTION OF THE PREFERRED EMBODIMENTS

Figure 1:
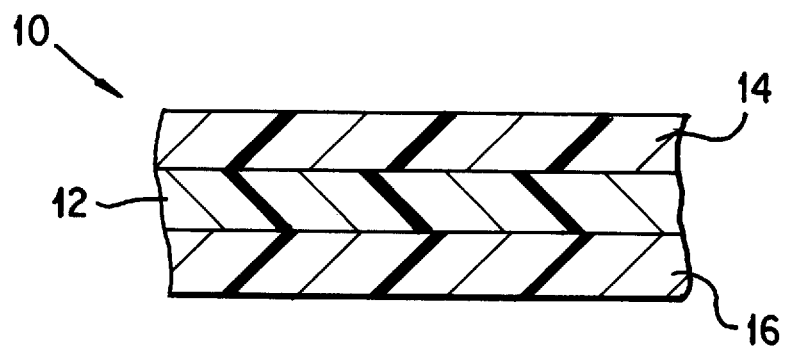
FIG. 1 discloses a schematic cross section of a film in accordance with the invention.

Referring to FIG. 1, an oriented film 10 of the present invention comprises a core layer 12 and surface layers 14 and 16.

The core layer 12 comprises a thermoplastic polyolefin (TPO).

"Thermoplastic polyolefin" or "TPO" typically refers to a rubber modified isotactic polypropylene. The "rubber" is usually a high ethylene content propylene-ethylene copolymer. A TPO may alternatively be defined as an impact modified polypropylene. Frequently, TPO materials are defined by suppliers as a continuous phase of isotactic propylene homopolymer and a dispersed phase of ethylene propylene rubber.

These materials are typically made by melt compounding or, more recently by in-reactor polymerization ("reactor grade"). Commercial examples include those identified in Table 1 herein, as well as Adpro™ available from Genesis.

The surface layers 14 and 16 are preferably of substantially the same composition. They preferably comprise an ethylene alpha olefin copolymer, an ethylene unsaturated ester copolymer, an ethylene acid copolymer, or any combination or blend thereof.

Ethylene alpha olefin copolymers are preferably copolymers of ethylene with one or more comonomers selected from $C_3$ to $C_{10}$ alpha olefins. Both heterogeneous and homogeneous materials can be used. Examples of heterogeneous materials include LLDPE (linear low density polyethylene), VLDPE (very low density polyethylene), ULDPE (ultra low density polyethylene), and the like. Homogeneous materials can include metallocene catalyzed polymers (MCP) such as those available from Exxon under the EXACT trademark, and available from Dow under the AFFINITY trademark.

Ethylene unsaturated ester copolymer refers to materials such as ethylene vinyl acetate copolymer (EVA), ethylene alkyl acrylate copolymers such as ethylene ethyl acrylate copolymer (EEA), ethylene methyl acrylate copolymer (EMA), and ethylene n-butyl acrylate copolymer (EnBA). It also refers to ethylene methyl methacrylate copolymer (EMMA).

Ethylene/unsaturated acid copolymer refers to materials such as ethylene acrylic acid copolymer (EAA), and ethylene methacrylic acid copolymer (EMAA). Metal salt neutralized or partially neutralized versions of these materials, such as ionomer, are also included herein.

Figure 2:
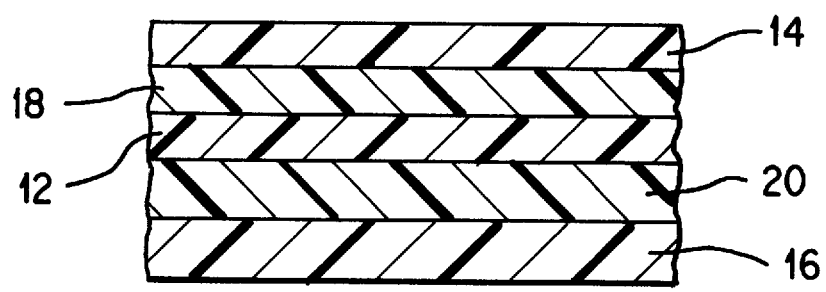
FIG. 2 shows an alternative embodiment of such a film.

Referring to FIG. 2, a five-layer embodiment of the present invention includes a core layer 12 and surface layers 14 and 16 like those described above. Continuous Intermediate layers 18 and 20 can comprise any of the same materials as those disclosed for surface layers 14 and 16. They can also comprise a polymeric adhesive, such as acid or acid anhydride modified olefinic polymers or copolymers. These adhesive materials are available from DuPont under the Bynel trademark, from Mitsui under the Admer trademark, and from Quantum under the Plexar trademark.

EXAMPLES

Three films with thermoplastic polyolefin (TPO) cores were compared to each other and to a control film in a package tightness/looseness test. The results show all three had better tightness retention over the course of the study than the control. Example 3 had the highest mean score for tightness. The control film was the SES 320 film made by Cryovac Division of W. R. Grace & Co.-Conn.

A "Package Tightness/Looseness Scoring Key" was developed by photographing tray overwrap packages of split breast chicken with varying levels of film tightness/looseness. The photographs were scored 1 to 5 with 1 being a very loose package and 5 being a very tight package. A photograph of a puffy package, where the film is domed above the chicken, was also included and scored "P".

Chicken split breasts were put up in #6 trays on an Ossid 750 packaging machine using the four different films. Four packages of chicken were made with each film. The packages were shrunk in a hot air tunnel and then in a hot water tunnel. One package of each film was placed in the bottom of four boxes, and three layers of #6 trays containing two water bags each were piled on top of the chicken. The chicken was stored in a cooler for three days. Packages were then put in a refrigerated display case and coded for sensory evaluation.

Ten panelists were asked to score each package for tightness/looseness with a number 1 to 5 corresponding to the photographs in the scoring key. Panelists were also instructed to mark a "P" for puffy next to the numerical score if necessary. The data was then entered into a program for statistical analysis of the different films' scores.

RESULTS

Each of Examples 1–3 were significantly tighter than the control. Example 3 was significantly tighter than Example 2, but Example 1 was not significantly different from either Example 2 or Example 3. No one film scored significantly more "P"s for puffiness than any other film.

The results are shown in Table 3.

Table 1 identifies the polymers present in each of Examples 1–3 and the control.

Table 2 identifies the structure of each of Examples 1–3 and the control.

TABLE 1

| RESIN | TRADENAME | SOURCE |
|---|---|---|
| $TPO_1$ | Exxtral R 200.01 | Exxon |
| $TPO_2$ | PPTR 134 | Quantum |
| $TPO_3$ | KS-081 P | Himont |
| $EAO_1$ | Dowlex 2045.04 | Dow |
| $EAO_2$ | Dowlex 2037 | Dow |
| $EUE_1$ | PE 1335 | Rexene |
| AB | Kaopolite SF | Kaopolite |

AB = antiblock; the Kaopolite SF is an anhydrous aluminum silicate;
$EAO_1$ is an ethylene/octene copolymer with a density of 0.920 grams/cm$^3$;
$EAO_2$ is an ethylene/octene copolymer with a density of 0.935 grams/cm$^3$; and
$EUE_1$ is an ethylene vinyl acetate copolymer with a vinyl acetate content of 3.3%.

AB=antiblock; the Kaopolite SF is an anhydrous aluminum silicate;

$EAO_1$ is an ethylene/octene copolymer with a density of 0.920 grams/cm$^3$;

$EAO_2$ is an ethylene/octene copolymer with a density of 0.935 grams/cm$^3$; and $EUE_1$ is an ethylene vinyl acetate copolymer with a vinyl acetate content of 3.3%.

TABLE 2

| EXAMPLE | STRUCTURE | | | | | DOSE (MR) |
|---|---|---|---|---|---|---|
| Control | 50% $EAO_1$/ +25% $EAO_2$/ +25% $EUE_1$/ | $EAO_1$/ | $EUE_1$/ | $EAO_1$/ | 50% $EAO_1$ / +25% $EAO_2$ / +25% $EUE_1$ | 6.6 |
| 1 | 50% $EAO_1$/ +25% $EAO_2$/ +25% $EUE_1$/ | $EAO_1$/ | $TPO_1$/ | $EAO_1$/ | 50% $EAO_1$ / +25% $EAO_2$ / +25% $EUE_1$ | 6.3 |
| 2 | 50% $EAO_1$/ +25% $EAO_2$/ +25% $EUE_1$/ | $EAO_1$/ | $TPO_2$/ | $EAO_1$/ | 50% $EAO_1$ / +25% $EAO_2$ / +25% $EUE_1$ | 4.6 |
| 3 | 50% $EAO_1$/ +25% $EAO_2$/ +25% $EUE_1$/ | $EAO_1$/ | $TPO_3$/ | $EAO_1$/ | 50% $EAO_1$ / +25% $EAO_2$ / +25% $EUE_1$ | 6.3 |
| 4 | 50% $EAO_1$/ +25% $EAO_2$/ +25% $EUE_1$/ | $EAO_1$/ | $TPO_1$/ | $EAO_1$/ | 50% $EAO_1$ / +25% $EAO_2$ / +25% $EUE_1$ | 6.6 |

Note: Examples 1 to 3 had surface layers comprising 95% of the indicated triple blend, as well as 3% antifog surfactant and 2% AB.

TABLE 3

| EXAMPLE | PACKAGE TIGHTNESS* |
|---|---|
| Control | 2.5 |
| 1 | 3.5 |
| 2 | 3.2 |
| 3 | 3.9 |

*Note that 1 = loose package; 5 = tight package.

Another film made in accordance with the present invention, and similar to the films of examples 1 to 3, showed memory characteristics superior to PVC.

Those skilled in the art will understand that modifications to the present invention can be made after review of the disclosure. Such modifications are deemed to be within the scope of the invention as claimed.

For example, although a three-layer and five-layer embodiment are disclosed, those in the art will readily understand that two, four, six, or more layers can be assembled into a multilayer film having the benefits described, when the TPO material is used. A monolayer oriented, preferably heat shrinkable film with TPO can also be made.

The examples were made by a tubular cast coextrusion process, well known in the art. However, other processes, such as flat cast extrusion or coextrusion, lamination, extrusion coating, extrusion lamination and the like can be employed. These alternative processes are well known in the art.

The examples were made by irradiating the extruded material prior to orientation. Films of the invention can be crosslinked by conventional means such as electronic or chemical crosslinking. Alternatively, the film can be post-irradiated, i.e. irradiated after orientation. Films of the present invention can also be made without crosslinking.

Orientation is accomplished by conventional means such as blown bubble or tenterframe. Orientation ratios can be at any suitable range or ratio, including 1:1 to 6:1 in either or both of the machine and transverse directions.

Although the sample packages were made on an Ossid 750 machine, other equipment, including overwrap machines such as the Ossid 500 and the Ilapak Delta P machines, can also be used in combination with the film of the present invention.

The films of the examples had a final thickness of about 60 gauge (0.6 mils). The outermost layers and core layer each formed about ⅙ of the final film thickness; the intermediate layers each formed about ¼ of the final film thickness. The relative thicknesses of each layer of multilayer embodiments of the present film can be chosen as appropriate. Preferred final film thicknesses are less than about 10 mils, more preferably less than about 2 mils, most preferably less than about 1 mil.

What is claimed is:

1. An oriented heat shrinkable multilayer film comprising:
   a) a core layer comprising a continuous phase of isotactic propylene homopolymer and a dispersed phase of ethylene propylene rubber;
   b) continuous intermediate layers, adjacent each side of the core layer, comprising a polymeric material selected from the group consisting of
      i) polymeric adhesive, and
      ii) a polymeric material selected from the group consisting of
         ethylene/alpha olefin copolymer,
         ethylene/vinyl acetate copolymer,
         ethylene/alkyl acrylate copolymer;
         ethylene/acrylic acid copolymer,
         ethylene/methacrylic acid copolymer,
         ionomer, and
         blends thereof; and
   c) two outer layers each bonded to a respective continuous intermediate layer, comprising a polymeric material selected from:
      i) ethylene/alpha olefin copolymer;
      ii) ethylene/unsaturated ester copolymer selected from the group consisting of ethylene/vinyl acetate copolymer, and ethylene/alkyl acrylate copolymer;
      iii) ethylene/unsaturated acid copolymer selected from the group consisting of ethylene/acrylic acid copolymer, ethylene/methacrylic acid copolymer, and ionomer; and
      iv) blends thereof.

2. The film of claim 1 wherein the ethylene/alpha olefin copolymer comprises a homogeneous ethylene/alpha olefin copolymer.

3. A package made from the film of claim 1.

4. The film of claim 1 wherein the film is cross-linked.

\* \* \* \* \*